United States Patent
Lu et al.

(10) Patent No.: US 9,899,138 B1
(45) Date of Patent: Feb. 20, 2018

(54) COIL STRUCTURE FOR GENERATING A UNIFORM MAGNETIC FIELD AND COIL APPARATUS HAVING THE SAME

(71) Applicant: AUTOMOTIVE RESEARCH & TESTING CENTER, Changhua Hsien (TW)

(72) Inventors: Chien-Chih Lu, Changhua Hsien (TW); Tzyy-Haw Huang, Changhua Hsien (TW)

(73) Assignee: Automotive Research & Testing Center, Changhua Hsien (TW)

( * ) Notice: Subject to any disclaimer, the term of this patent is extended or adjusted under 35 U.S.C. 154(b) by 0 days.

(21) Appl. No.: 15/393,958

(22) Filed: Dec. 29, 2016

(51) Int. Cl.
*H01F 5/00* (2006.01)
*H01F 27/28* (2006.01)
*H01F 27/29* (2006.01)
*H02J 7/02* (2016.01)
*H02M 7/537* (2006.01)

(52) U.S. Cl.
CPC ........... *H01F 27/2823* (2013.01); *H01F 5/00* (2013.01); *H01F 27/29* (2013.01); *H02J 7/025* (2013.01); *H02M 7/537* (2013.01)

(58) Field of Classification Search
CPC ..................... H01F 5/00; H01F 27/00–27/36
USPC ..................... 336/65, 83, 200, 232, 206–208
See application file for complete search history.

(56) References Cited

U.S. PATENT DOCUMENTS

| | | | | |
|---|---|---|---|---|
| 5,572,179 A | * | 11/1996 | Ito | H01F 17/0006 336/200 |
| 7,321,285 B2 | * | 1/2008 | Hung | H01F 17/0006 336/200 |
| 7,538,652 B2 | * | 5/2009 | Jenkins | H01F 17/0013 336/200 |
| 2016/0164332 A1 | | 6/2016 | Elkhouly et al. | |

* cited by examiner

*Primary Examiner* — Tuyen Nguyen
(74) *Attorney, Agent, or Firm* — Birch, Stewart, Kolasch & Birch, LLP

(57) ABSTRACT

A coil structure for generating a uniform magnetic field and a coil apparatus having the same are disclosed. The coil apparatus has a plurality of coil units, and each of the coil units includes a sub-coil and a plurality of wire sections. The sub-coil has an eccentric-coil portion and two circuit connecting portions. The two circuit connecting portions are respectively connected to two segments of the eccentric-coil portion. The wire sections are arranged in parallel at intervals, are opposite the sub-coil, overlap the sub-coil, and are relatively inclined to the sub-coil. The circuit connecting portions of the segments of the coil units are connected to each other to form an auxiliary coil. A center position of the sub-coils is corresponding to a center position of the auxiliary coil so that a current flows through the sub-coils and the auxiliary coil to generate a uniform magnetic field.

14 Claims, 9 Drawing Sheets

COIL STRUCTURE FOR GENERATING A UNIFORM MAGNETIC FIELD AND COIL APPARATUS HAVING THE SAME

BACKGROUND

1. Technical Field

The present disclosure relates generally to a coil structure and a coil apparatus, and more particularly to a coil structure for generating a uniform magnetic field and a coil apparatus having the same.

2. Description of Related Art

A conventional wireless charging system mainly includes a DC-to-DC converter, a DC-to-AC converter, and a coil, which are electrically connected in sequence. The DC-to-DC converter receives a DC power source. The DC-to-AC converter converts an output DC power source generated from the DC-to-DC converter and converts the output DC power source into an output AC power source. The AC power source is provided to the coil to outwardly generate a magnetic field for wireless charging applications. Accordingly, when an electronic apparatus with a wireless charging function is placed in the magnetic field, a charging power source, converted from magnetic energy induced in the magnetic field by the electronic apparatus, is provided to charge the electronic apparatus in a wireless and non-contact manner.

In particular, the charging efficiency relates to uniformity of a magnetic field generated from a coil. For example, US Patent Publication No. 2016/0164332 discloses a tiled wireless charging coil solution for maintaining significantly improved field uniformity, coupling and power transfer efficiency. Accordingly, a coil structure for generating a uniform magnetic field and a coil apparatus having the same are proposed in the present disclosure.

SUMMARY

An objective of the present disclosure is to provide a coil structure for generating a uniform magnetic field and a coil apparatus having the same. The coil structure and the coil apparatus are provided to electrically connect to a control circuit, and the coil structure and the coil apparatus are controlled by the control circuit to generate a uniform magnetic field, thereby improving efficiency of wireless charging for different electronic apparatuses.

The coil structure for generating a uniform magnetic field includes:

a sub-coil including an eccentric-coil portion having two segments opposite each other, and two circuit connecting portions respectively connected to the two segments of the eccentric-coil portion; and a plurality of wire sections arranged in parallel at intervals, opposite the sub-coil, overlapping the sub-coil, and relatively inclined to the sub-coil, wherein each one of the wire sections has two ends as two coil connecting portions respectively.

The two circuit connecting portions of the sub-coil are provided to electrically connect to a control circuit. When the control circuit supplies a current to the sub-coil, the sub-coil generates a uniform magnetic field for wireless charging applications. The magnetic field generated by the sub-coil is not affected since the current does not flow through the wire sections.

A coil apparatus for generating a uniform magnetic field includes a plurality of coil units detachably assembled and arranged as a matrix arrangement, and each of the coil units includes:

a sub-coil including an eccentric-coil portion having two segments opposite each other, and two circuit connecting portions respectively connected to the two segments of the eccentric-coil portion; and a plurality of wire sections arranged in parallel at intervals, opposite the sub-coil, overlapping the sub-coil, and relatively inclined to the sub-coil, wherein each one of the wire sections has two ends as two coil connecting portions respectively;

wherein the coil connecting portions of the wire sections of the coil units are connected to each other to form an auxiliary coil, the auxiliary coil is connected in series between the sub-coils of the coil units, and a center position of the sub-coils is corresponding to a center position of the auxiliary coil.

When the sub-coils of the coil units are connected in series to the auxiliary coil and a current flows through the sub-coils and the auxiliary coil, the sub-coils can independently generate a uniform magnetic field. A center position of the sub-coils is corresponding to a center position of the auxiliary coil so that a magnetic field generated by the auxiliary coil is at the center of the sub-coils. Accordingly, the coil apparatus is provided to generate a uniform magnetic field for wireless charging applications.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The features of the present disclosure believed to be novel are set forth with particularity in the appended claims. The present disclosure itself, however, may be best understood by reference to the following, detailed description of the present disclosure, which describes an exemplary embodiment of the present disclosure, taken in conjunction with the accompanying drawings, in which:

DETAILED DESCRIPTION

Figure 1:
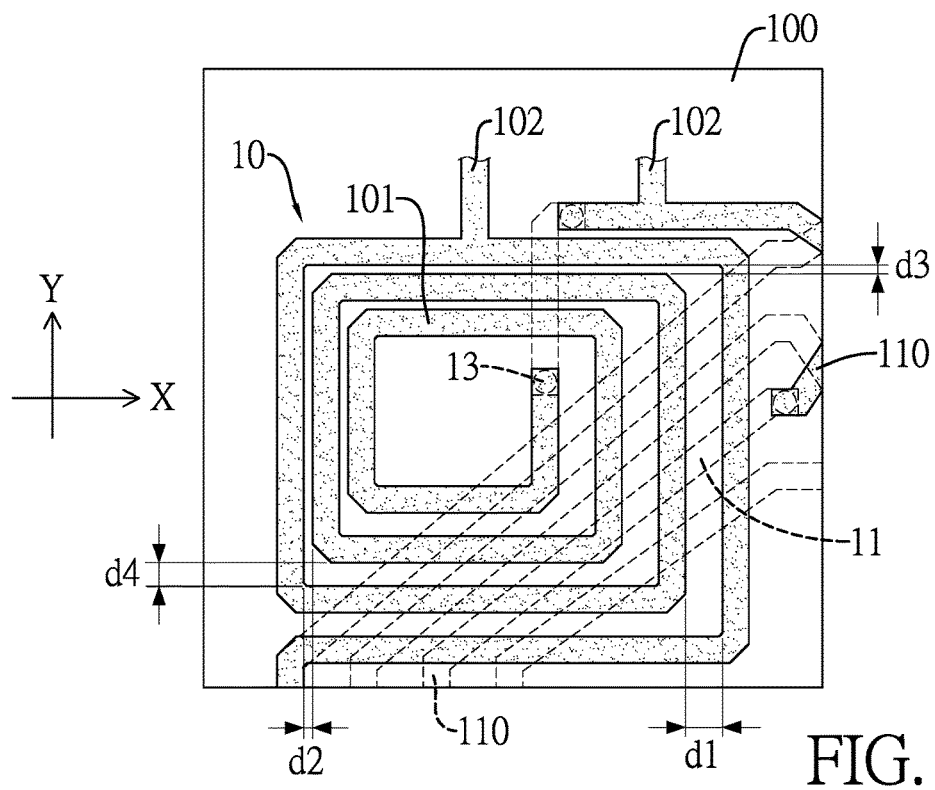
FIG. 1 is a schematic plan view of a coil structure according to a first embodiment of the present disclosure.

Reference will now be made to the drawing figures to describe the present disclosure in detail.

Referring to FIG. 1, a first embodiment of the coil structure for generating a uniform magnetic field includes a sub-coil 10 and a plurality of wire sections 11. The sub-coil 10 is mounted on a top surface of a substrate 100. The sub-coil 10 includes an eccentric-coil portion 101 and two circuit connecting portions 102. The eccentric-coil portion 101 is a component bent from inside to outside on the same plane. The eccentric-coil portion 101 has two segments corresponding to each other. The two circuit connecting portions 102 are connected to the two segments of the eccentric-coil portion 101, respectively. The wire sections 11 are mounted on a bottom surface of the substrate 100, and the wire sections 11 are arranged in parallel at intervals. The wire sections 11 overlap the sub-coil 10 and are relatively inclined to the sub-coil 10. Each of the wire sections 11 has two ends as two coil connecting portions 110 respectively. The coil connecting portions 110 of the wire sections 11 are located at edges of the top surface or edges of the bottom surface of the substrate 100.

The top surface and the bottom surface of the substrate 100 are referenced to as an X-Y plane. As shown in FIG. 1, the eccentric-coil portion 101 of the sub-coil 10 is a rectangular eccentric-coil portion. The two circuit connecting portions 102 are mounted on the positive Y-direction of the top surface of the substrate 100. A wire gap d1 of the eccentric-coil portion 101 in the positive X-direction is greater than a wire gap d2 of the eccentric-coil portion 101 in the negative X-direction. A wire gap d3 of the eccentric-coil portion 101 in the positive Y-direction is less than a wire gap d4 of the eccentric-coil portion 101 in the negative Y-direction. As shown in FIG. 1, the wire sections 11 are arranged along a tilted direction from the positive X-direction and the positive Y-direction to the negative X-direction and the negative Y-direction.

Figure 2:
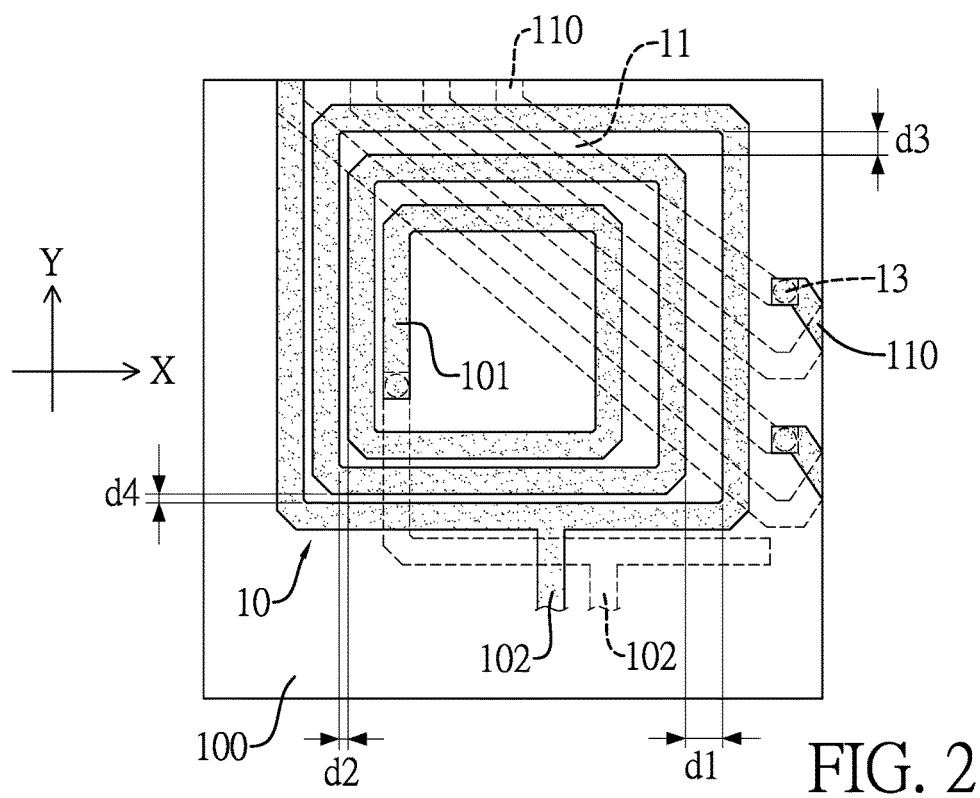
FIG. 2 is a schematic plan view of the coil structure according to a second embodiment of the present disclosure.

Referring to FIG. 2, the eccentric-coil portion 101 of the sub-coil 10 is a rectangular eccentric-coil portion. The two circuit connecting portions 102 are mounted on the negative Y-direction of the top surface of the substrate 100. The wire gap d1 of the eccentric-coil portion 101 in the positive X-direction is greater than the wire gap d2 of the eccentric-coil portion 101 in the negative X-direction. The wire gap d3 of the eccentric-coil portion 101 in the positive Y-direction is greater than the wire gap d4 of the eccentric-coil portion 101 in the negative Y-direction. As shown in FIG. 2, the wire sections 11 are arranged along a tilted direction from the negative X-direction and the positive Y-direction to the positive X-direction and the negative Y-direction.

Figure 3:
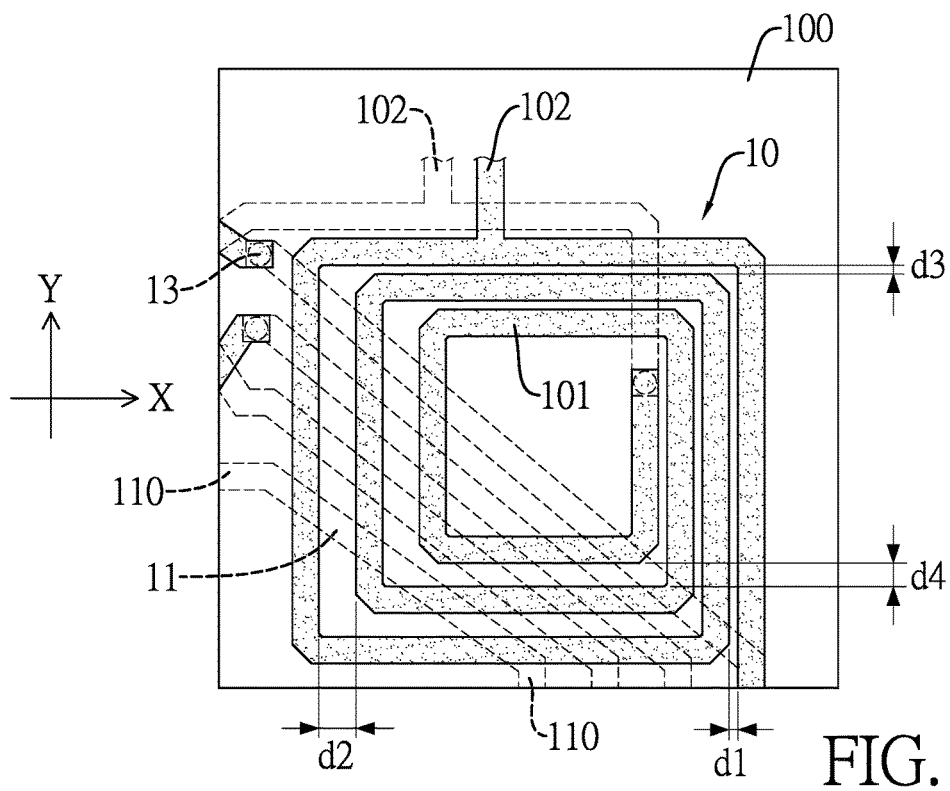
FIG. 3 is a schematic plan view of the coil structure according to a third embodiment of the present disclosure.

Referring to FIG. 3, the eccentric-coil portion 101 of the sub-coil 10 is a rectangular eccentric-coil portion. The two circuit connecting portions 102 are mounted on the positive Y-direction of the top surface of the substrate 100. The wire gap d1 of the eccentric-coil portion 101 in the positive X-direction is less than the wire gap d2 of the eccentric-coil portion 101 in the negative X-direction. The wire gap d3 of the eccentric-coil portion 101 in the positive Y-direction is less than the wire gap d4 of the eccentric-coil portion 101 in the negative Y-direction. As shown in FIG. 3, the wire sections 11 are arranged along a tilted direction from the negative X-direction and the positive Y-direction to the positive X-direction and the negative Y-direction.

Figure 4:
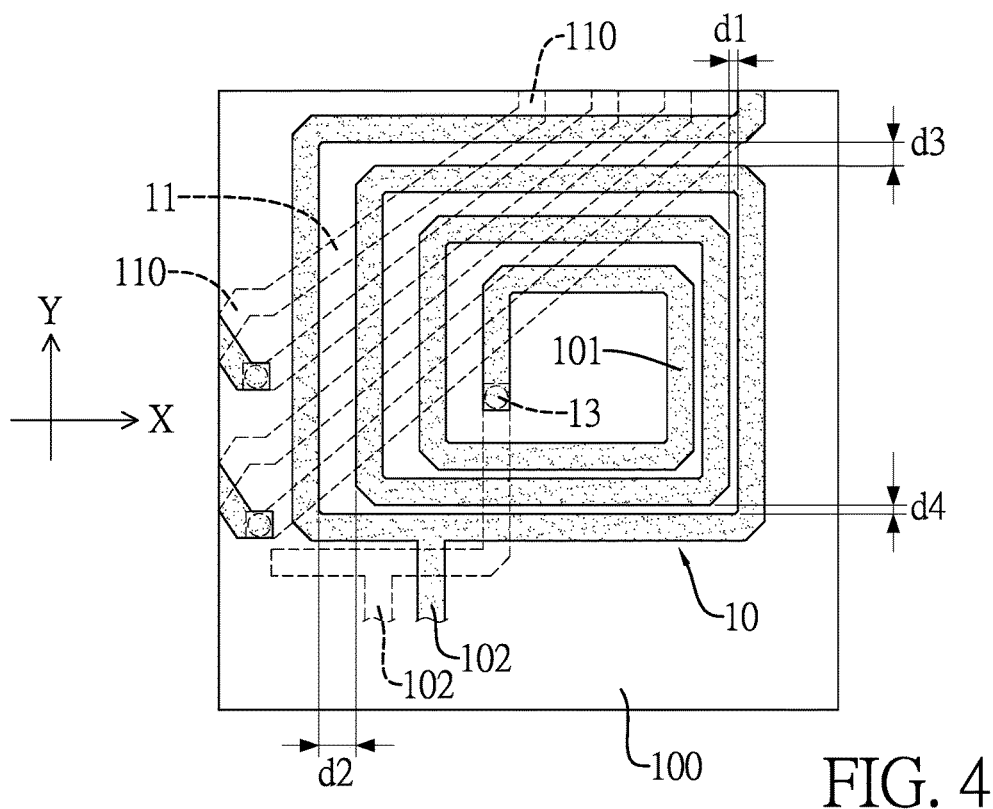
FIG. 4 is a schematic plan view of the coil structure according to a fourth embodiment of the present disclosure.

Referring to FIG. 4, the eccentric-coil portion 101 of the sub-coil 10 is a rectangular eccentric-coil portion. The two circuit connecting portions 102 are mounted on the negative Y-direction of the top surface of the substrate 100. The wire gap d1 of the eccentric-coil portion 101 in the positive X-direction is less than the wire gap d2 of the eccentric-coil portion 101 in the negative X-direction. The wire gap d3 of the eccentric-coil portion 101 in the positive Y-direction is greater than the wire gap d4 of the eccentric-coil portion 101 in the negative Y-direction. As shown in FIG. 4, the wire sections 11 are arranged along a tilted direction from the positive X-direction and the positive Y-direction to the negative X-direction and the negative Y-direction.

Figure 5:
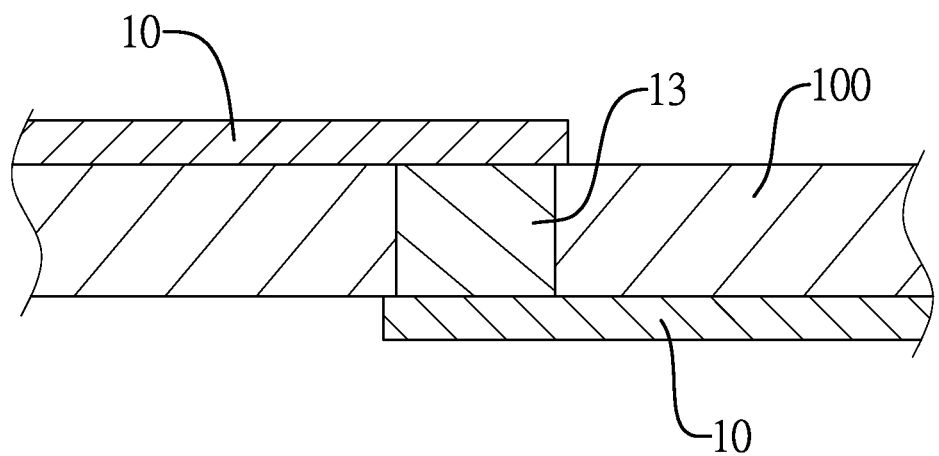
FIG. 5 is a schematic cross-sectional view of a conductive part penetrating a substrate according to the present disclosure.

As shown in FIG. 1 to FIG. 4, a part of the sub-coil 10 may be arranged on the top surface and the bottom surface of the substrate 100. Referring to FIG. 5, the substrate 100 further provides a conductive part 13. The conductive part 13 penetrates the top surface and the bottom surface of the substrate 100 for providing an electrical connection between the sub-coils 10 mounted on the top surface and the bottom surface of the substrate 100. Further, the conductive part 13 provides an electrical connection between the wire sections 11 mounted on the top surface and the bottom surface of the substrate 100.

In the coil structure of the present disclosure, the two circuit connecting portions 102 of the sub-coil 10 are provided to electrically connect to a control circuit. When the control circuit supplies a current to the sub-coil 10, the sub-coil 10 generates a uniform magnetic field according to the structural design of the eccentric-coil portion 101 for wireless charging applications.

Figure 6:
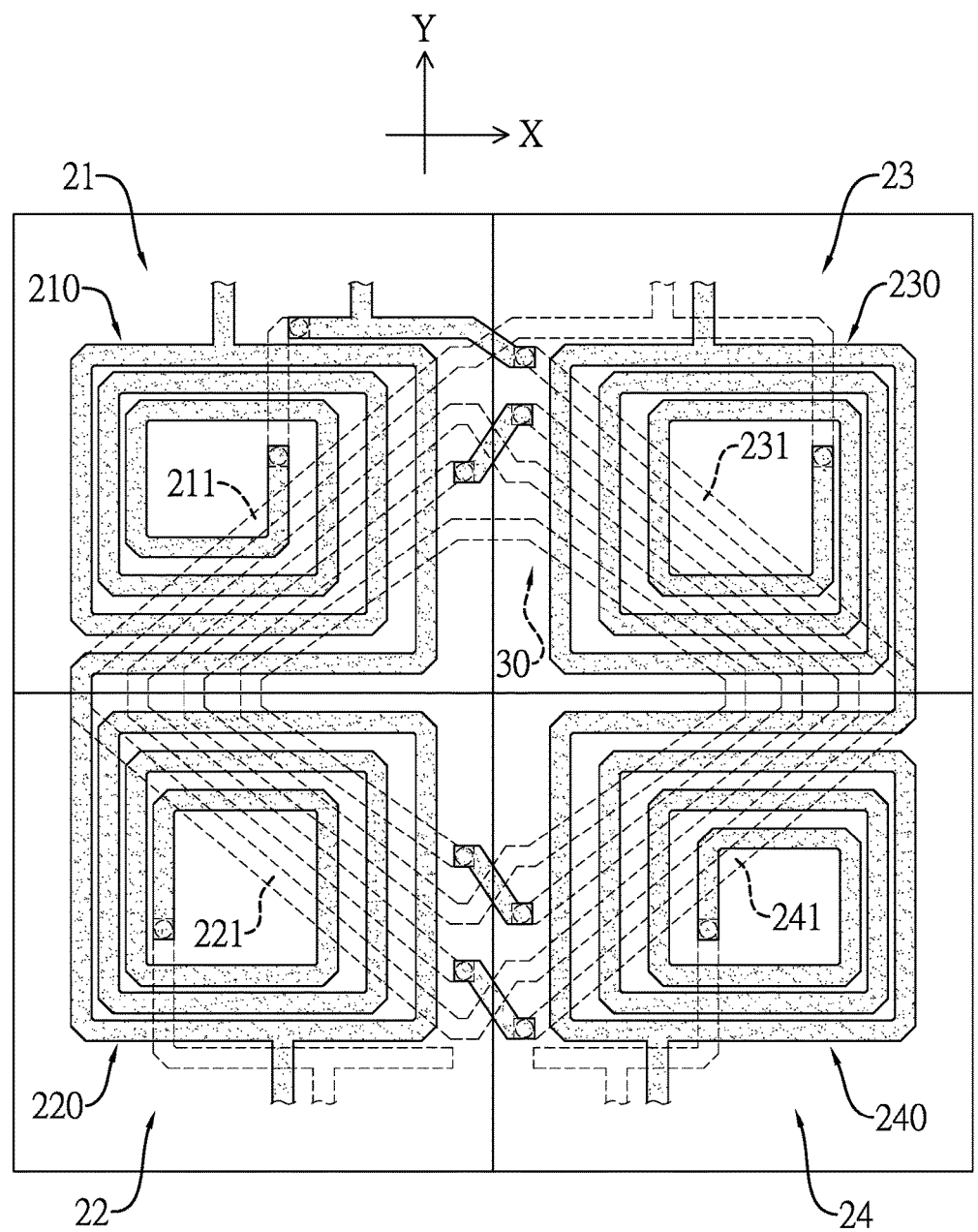
FIG. 6 is a schematic plan view of a coil apparatus according to the present disclosure.

Referring to FIG. 6, a coil apparatus for generating a uniform magnetic field includes a plurality of coil units 21-24. The coil units 21-24 are detachably assembled and arranged as a matrix arrangement. Each of the coil units 21-24 has the sub-coil and the wire sections. When the coil units 21-24 are connected, the coil connecting portions of the wire sections of the coil units 21-24 are connected to each other to form an auxiliary coil 30. The auxiliary coil 30 is connected in series between the sub-coils of the coil units 21-24.

As shown in FIG. 6, the coil units 21-24 include a first coil unit 21, a second coil unit 22, a third coil unit 23, and a fourth coil unit 24. The coil structure of the first coil unit 21, having a sub-coil 210 and a plurality of wire sections 211, is corresponding to the coil structure of the first embodiment shown in FIG. 1. The coil structure of the second coil unit 22, having a sub-coil 220 and a plurality of wire sections 221, is corresponding to the coil structure of the second embodiment shown in FIG. 2. The coil structure of the third coil unit 23, having a sub-coil 230 and a plurality of wire sections 231, is corresponding to the coil structure of the third embodiment shown in FIG. 3. The coil structure of the fourth coil unit 24, having a sub-coil 240 and a plurality of wire sections 241, is corresponding to the coil structure of the fourth embodiment shown in FIG. 4. The detailed descriptions of the coil structures in the four embodiments are omitted here for conciseness.

As shown in FIG. 6 and FIG. 1 to FIG. 4, the wire sections 211 of the first coil unit 21 are connected between the wire sections 221 of the second coil unit 22 and the wire sections 231 of the third coil unit 23 by connecting the two coil connecting portions 110 of each of the wire sections 211 to the two coil connecting portions 110 of each of the wire sections 221 and the two coil connecting portions 110 of each of the wire sections 231. Also, the wire sections 241 of the fourth coil unit 24 are connected between the wire sections 221 of the second coil unit 22 and the wire sections 231 of the third coil unit 23 by connecting the two coil connecting portions 110 of each of the wire sections 241 to the two coil connecting portions 110 of each of the wire sections 221 and the two coil connecting portions 110 of each of the wire sections 231. Accordingly, the wire sections 211 of the first coil unit 21, the wire sections 221 of the second coil unit 22, the wire sections 231 of the third coil unit 23, and the wire sections 241 of the fourth coil unit 24 are connected to each other to form the auxiliary coil 30. In this embodiment, the auxiliary coil 30 is a rhombic-shaped component. A center position of the sub-coils 210-240 of the coil units 21-24 is corresponding to a center position of the auxiliary coil 30.

As shown in FIG. 6, the sub-coil 220 of the second coil unit 22 is connected in series to the sub-coil 210 of the first coil unit 21, the sub-coil 210 of the first coil unit 21 is connected in series to the auxiliary coil 30, the auxiliary coil 30 is connected in series to the sub-coil 230 of the third coil unit 23, and the sub-coil 230 of the third coil unit 23 is connected in series to the sub-coil 240 of the fourth coil unit 24. The auxiliary coil 30 may be connected between the sub-coils 210-240 of the coil units 21-24. When the current flows through the sub-coils 210-240 and the auxiliary coil 30, the sub-coils 210-240 can independently generate a magnetic field and the auxiliary coil 30 can generate a magnetic field at the center position of the sub-coils 210-240. Accordingly, the magnetic field generated by the coil apparatus is uniform.

Figure 7:
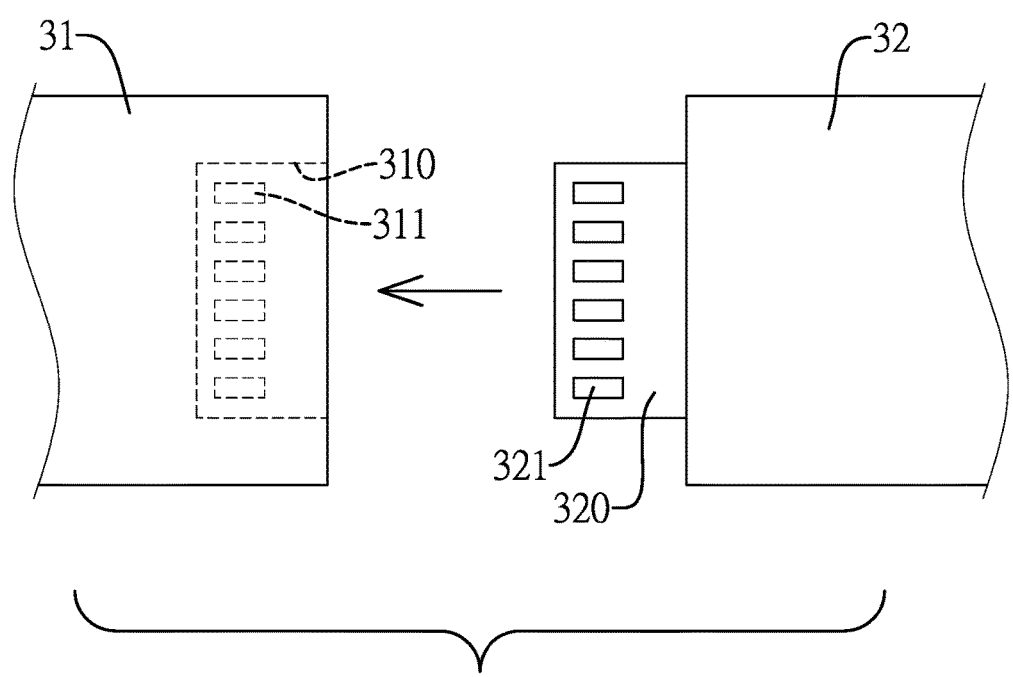
FIG. 7 is a schematic view of a connection of two coil units of the coil apparatus according to the present disclosure.

In one example, the first coil unit 21 and the second coil unit 22 are exemplified for demonstration of connection structures of the coil units 21-24 as follows, and the rest may be deduced by analogy. Referring to FIG. 7, the first coil unit 21 is installed inside a first casing 31, and the second coil unit 22 is installed inside a second casing 32. The first casing 31 includes a slot 310 having a plurality of conductive contacts 311. The conductive contacts 311 of the slot 310 are electrically connected to the sub-coil 210 and the wire sections 211 of the first coil unit 21. The second casing 32 includes a plug 320 having a plurality of conductive contacts 321. The conductive contacts 321 of the plug 320 are electrically connected to the sub-coil 220 and the wire sections 221 of the second coil unit 22. When the first casing 31 is combined with the second casing 32, the plug 320 is correspondingly inserted into the slot 310 so that the conductive contacts 321 of the plug 320 are electrically connected to the conductive contacts 311 of the slot 310. Accordingly, the first coil unit 21 is electrically connected to the second coil unit 22.

Figure 8:
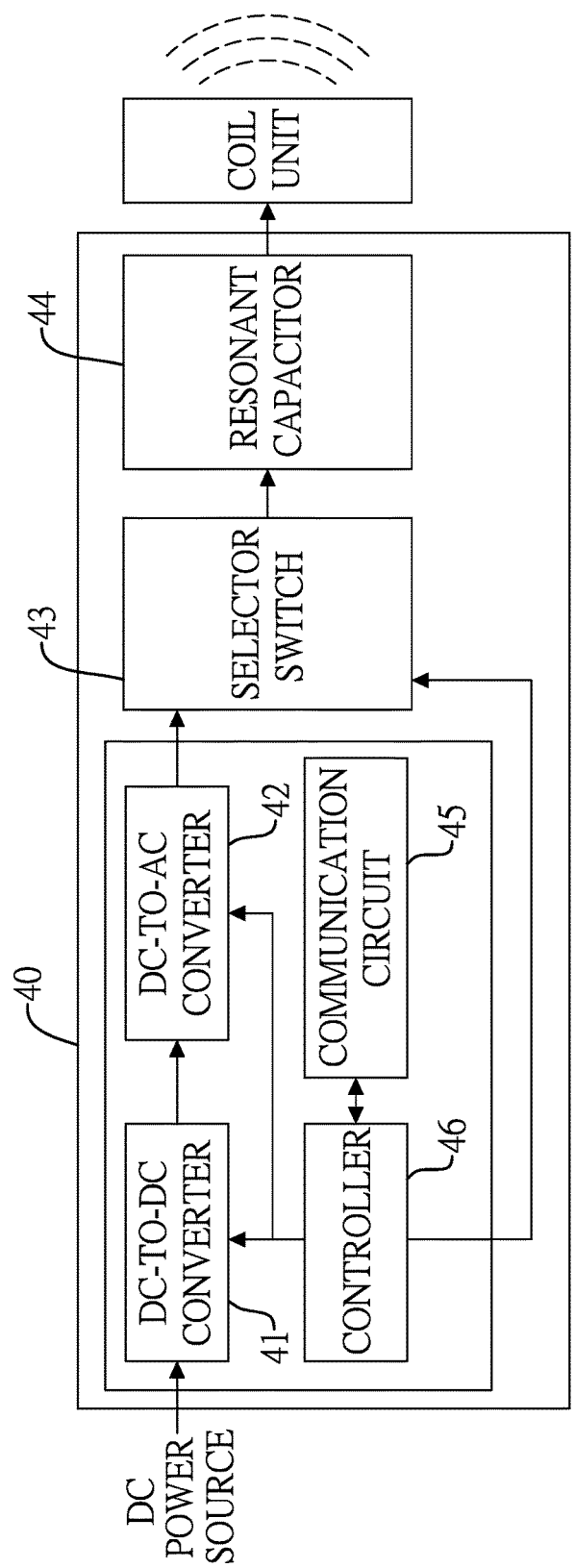
FIG. 8 is a schematic view of a connection between the coil unit and a control circuit.

Referring to FIG. 8, in the coil apparatus, each of the coil units 21-24 is electrically connected to a control circuit 40. The control circuit 40 includes a DC-to-DC converter 41, a DC-to-AC converter 42, a selector switch 43, a resonant capacitor 44, a communication circuit 45, and a controller 46.

The DC-to-DC converter 41 has an input end and an output end, and the input end of the DC-to-DC converter 41 receives a DC power source. The DC-to-AC converter 42 has an input end and an output end, and the input end of the DC-to-AC converter 42 is electrically connected to the output end of the DC-to-DC converter 41 to receive an output DC power source converted from the DC-to-DC converter 41. The DC-to-AC converter 42 converts the output DC power source converted from the DC-to-DC converter 41 into an output AC power source. The output end of the DC-to-AC converter 42 is electrically connected to one of the coil units 21-24 through the selector switch 43 and the resonant capacitor 44 so that said one of the coil units 21-24 outwardly propagates electromagnetic waves.

The controller 46 is electrically connected to the DC-to-DC converter 41, the DC-to-AC converter 42, the selector switch 43, and the communication circuit 45. The controller 46 controls the DC-to-DC converter 41 and the DC-to-AC converter 42 to generate the output AC power source by converting the DC power source. The communication circuit 45 is controlled by the controller 46 to outwardly provide connections, and the controller 46 controls the selector switch 43 to turn on or off.

Figure 9:
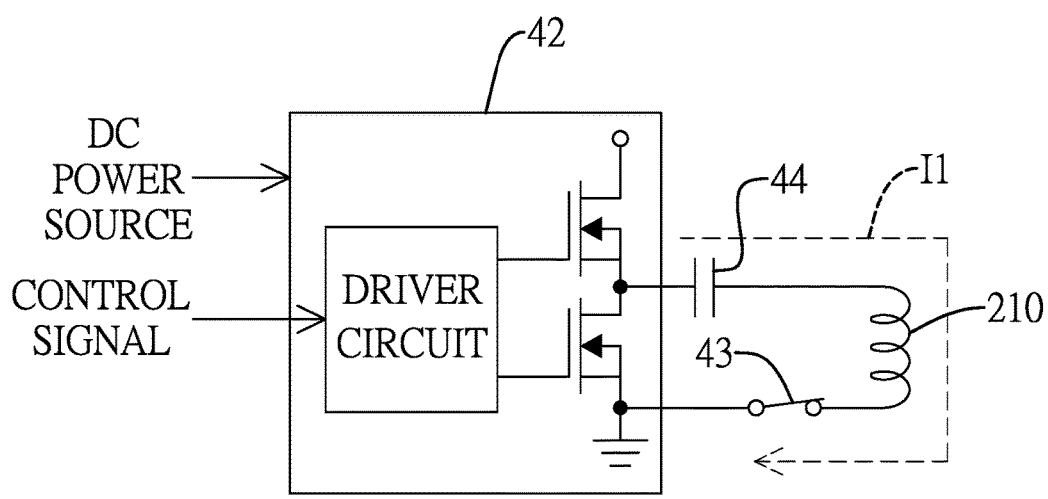
FIG. 9 is a schematic view of driving a sub-coil by the control circuit according to the present disclosure.

Referring to FIG. 9, in one example, the sub-coil 210 of the first coil unit 21 and the control circuit 40 thereof are exemplified for demonstration. The selector switch 43, the resonant capacitor 44, and the sub-coil 210 are connected in series at the output end of the DC-to-AC converter 42. When the selector switch 43 is turned on by the controller 46, an output current I1 is generated from the DC-to-AC converter 42 and the output current I1 flows through the resonant capacitor 44 and the sub-coil 210 of the first coil unit 21 to establish a magnetic field by the sub-coil 210. In other words, the control circuit 40 drives the sub-coil 210 of the first coil unit 21 to generate a uniform magnetic field for wireless charging applications when the first coil unit 21 is not connected to the other coil units.

Figure 10:
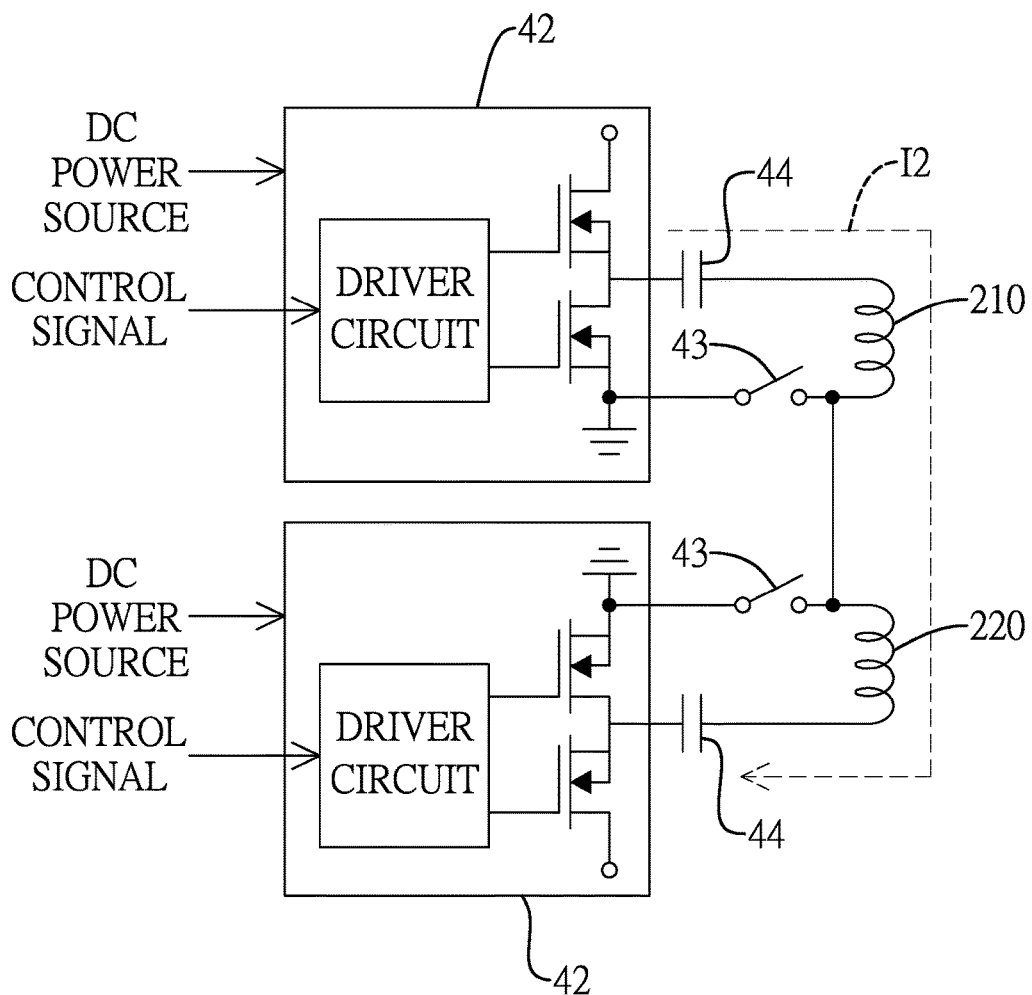
FIG. 10 is a schematic view of driving two sub-coils by the control circuit according to the present disclosure.

In another embodiment, the second coil unit 22 is connected to one of the first coil unit 21 and the fourth coil unit 24. Referring to FIG. 10, in this embodiment, the connection between the second coil unit 22 and the first coil unit 21 is exemplified for demonstration. When the selector switch 43 of the first coil unit 21 and the selector switch 43 of the second coil unit 22 are both turned off by the controller 46, the sub-coil 210 of the first coil unit 21 is connected in series to the sub-coil 220 of the second coil unit 22. Accordingly, an output current I2 is generated from the two DC-to-AC converters 42 and the output current I2 flows through the two resonant capacitors 44 and the sub-coil 210 of the first coil unit 21 and the sub-coil 220 of the second coil unit 22 to generate magnetic fields by the sub-coils 210, 220 for wireless charging applications.

Figure 11:
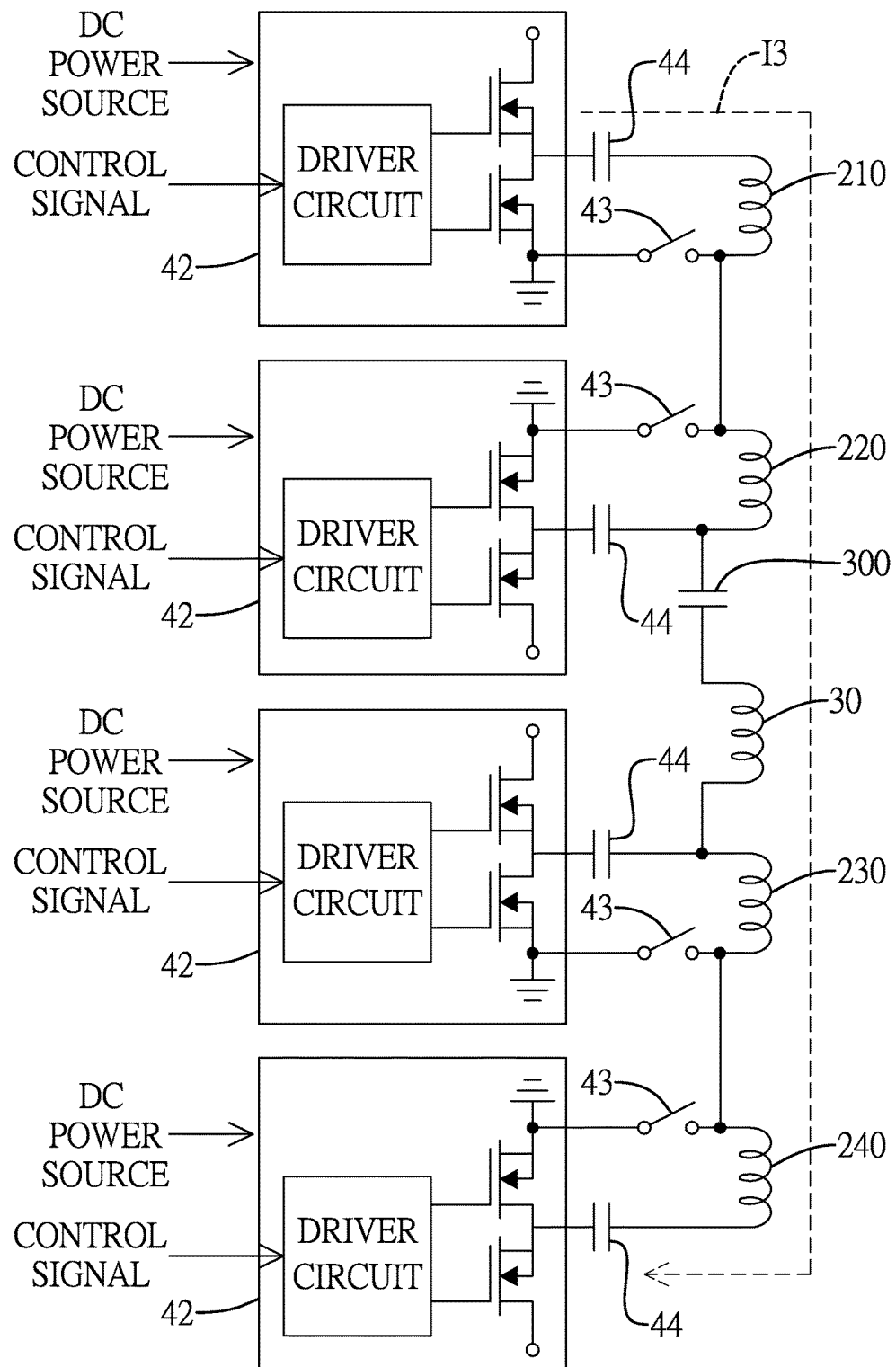
FIG. 11 is a schematic view of driving the coil apparatus according to the present disclosure.

In further another embodiment, the coil units 21-24 are connected to each other. Referring to FIG. 11 and FIG. 6, the selector switches 43 of the coil units 21-24 are all turned off by the controller 46, and the sub-coils 210-240 of the coil units 21-24 and the auxiliary coil 30 are connected in series. The auxiliary coil 30 is connected in series to an auxiliary resonant capacitor 300 so that the series-connected configuration of the auxiliary coil 30 and the auxiliary resonant capacitor 300 is connected between the sub-coil 220 of the second coil unit 22 and the sub-coil 230 of the third coil unit 23. Accordingly, an output current I3 is generated from the four DC-to-AC converters 42. The output current I3 flows through the resonant capacitor 44 corresponding to the first coil unit 21, the sub-coils 210-240 of the coil units 21-24, the auxiliary coil 30, the auxiliary resonant capacitor 300, and the resonant capacitor 44 corresponding to the fourth coil unit 24 to generate a uniform magnetic field for wireless charging applications.

In conclusion, when only one coil unit is operated as shown in FIG. 9, the sub-coil 210 of the first coil unit 21 can alone generate a lower uniform magnetic field for wireless charging a low-power electronic apparatus. When two coil units are operated as shown in FIG. 10, the sub-coil 210 of the first coil unit 21 and the sub-coil 220 of the second coil unit 22 can independently generate a lower uniform magnetic field for wireless charging two low-power electronic apparatuses. When four coil units are operated as shown in FIG. 11 and FIG. 6, the four sub-coils 210-240 and the auxiliary coil 30 can generate a higher uniform magnetic field for wireless charging a high-power electronic apparatus. Accordingly, the coil apparatus of the present disclosure can be applied to different electronic apparatuses depending on the required power thereof, thereby significantly improving the practicality of the coil apparatus.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A coil structure for generating a uniform magnetic field, comprising:
    a sub-coil comprising
        an eccentric-coil portion having two segments opposite each other; and
        two circuit connecting portions respectively connected to the two segments of the eccentric-coil portion; and
    a plurality of wire sections arranged in parallel at intervals, opposite the sub-coil, overlapping the sub-coil, and relatively inclined to the sub-coil, wherein each one of the wire sections has two ends as two coil connecting portions respectively.

2. The coil structure as claimed in claim 1, wherein
    the eccentric-coil portion of the sub-coil is a rectangular eccentric-coil portion;
    a wire gap of the eccentric-coil portion in a positive X-direction is greater than a wire gap of the eccentric-coil portion in a negative X-direction;
    a wire gap of the eccentric-coil portion in a positive Y-direction is less than a wire gap of the eccentric-coil portion in a negative Y-direction; and
    the wire sections are arranged along a tilted direction from the positive X-direction and the positive Y-direction to the negative X-direction and the negative Y-direction.

3. The coil structure as claimed in claim 1, wherein
    the eccentric-coil portion of the sub-coil is a rectangular eccentric-coil portion;
    a wire gap of the eccentric-coil portion in a positive X-direction is greater than a wire gap of the eccentric-coil portion in a negative X-direction;
    a wire gap of the eccentric-coil portion in a positive Y-direction is greater than a wire gap of the eccentric-coil portion in a negative Y-direction; and
    the wire sections are arranged along a tilted direction from the negative X-direction and the positive Y-direction to the positive X-direction and the negative Y-direction.

4. The coil structure as claimed in claim 1, wherein
    the eccentric-coil portion of the sub-coil is a rectangular eccentric-coil portion;
    a wire gap of the eccentric-coil portion in a positive X-direction is less than a wire gap of the eccentric-coil portion in a negative X-direction;
    a wire gap of the eccentric-coil portion in a positive Y-direction is less than a wire gap of the eccentric-coil portion in a negative Y-direction; and
    the wire sections are arranged along a tilted direction from the negative X-direction and the positive Y-direction to the positive X-direction and the negative Y-direction.

5. The coil structure as claimed in claim 1, wherein
    the eccentric-coil portion of the sub-coil is a rectangular eccentric-coil portion;
    a wire gap of the eccentric-coil portion in a positive X-direction is less than a wire gap of the eccentric-coil portion in a negative X-direction;
    a wire gap of the eccentric-coil portion in a positive Y-direction is greater than a wire gap of the eccentric-coil portion in a negative Y-direction; and
    the wire sections are arranged along a tilted direction from the positive X-direction and the positive Y-direction to the negative X-direction and the negative Y-direction.

6. The coil structure as claimed in claim 1, wherein
    the sub-coil is mounted on a top surface of a substrate;
    the eccentric-coil portion is a component bent from inside to outside on the same plane; the wire sections are mounted on a bottom surface of the substrate; and
    the coil connecting portions of the wire sections are located at edges of the top surface or edges of the bottom surface of the substrate.

7. The coil structure as claimed in claim 2, wherein the sub-coil is mounted on a top surface of a substrate, and the eccentric-coil portion is a component bent from inside to outside on the same plane; the wire sections are mounted on a bottom surface of the substrate, and the coil connecting portions of the wire sections are located at edges of the top surface or edges of the bottom surface of the substrate.

8. The coil structure as claimed in claim 3, wherein the sub-coil is mounted on a top surface of a substrate, and the eccentric-coil portion is a component bent from inside to outside on the same plane; the wire sections are mounted on a bottom surface of the substrate, and the coil connecting portions of the wire sections are located at edges of the top surface or edges of the bottom surface of the substrate.

9. The coil structure as claimed in claim 4, wherein the sub-coil is mounted on a top surface of a substrate, and the eccentric-coil portion is a component bent from inside to outside on the same plane; the wire sections are mounted on a bottom surface of the substrate, and the coil connecting portions of the wire sections are located at edges of the top surface or edges of the bottom surface of the substrate.

10. The coil structure as claimed in claim 5, wherein the sub-coil is mounted on a top surface of a substrate, and the eccentric-coil portion is a component bent from inside to outside on the same plane; the wire sections are mounted on a bottom surface of the substrate, and the coil connecting portions of the wire sections are located at edges of the top surface or edges of the bottom surface of the substrate.

11. A coil apparatus for generating a uniform magnetic field, comprising a plurality of coil units detachably assembled and arranged as a matrix arrangement, wherein each of the coil units comprises:
    a sub-coil comprising
        an eccentric-coil portion having two segments opposite each other; and
        two circuit connecting portions respectively connected to the two segments of the eccentric-coil portion; and
    a plurality of wire sections arranged in parallel at intervals, opposite the sub-coil, overlapping the sub-coil, and relatively inclined to the sub-coil, wherein each one of the wire sections has two ends as two coil connecting portions respectively;
    wherein the coil connecting portions of the wire sections of the coil units are connected to each other to form an auxiliary coil, the auxiliary coil is connected in series between the sub-coils of the coil units, and a center position of the sub-coils is corresponding to a center position of the auxiliary coil.

12. The coil apparatus as claimed in claim 11, wherein the eccentric-coil portion of the sub-coil is an eccentric-coil portion, and the auxiliary coil is a rhombic-shaped component.

13. The coil apparatus as claimed in claim 12, wherein the coil units include a first coil unit, a second coil unit, a third coil unit, and a fourth coil unit;

in the first coil unit, a wire gap of the eccentric-coil portion in a positive X-direction is greater than a wire gap of the eccentric-coil portion in a negative X-direction, a wire gap of the eccentric-coil portion in a positive Y-direction is less than a wire gap of the eccentric-coil portion in a negative Y-direction; the wire sections are arranged along a tilted direction from the positive X-direction and the positive Y-direction to the negative X-direction and the negative Y-direction;

in the second coil unit, a wire gap of the eccentric-coil portion in a positive X-direction is greater than a wire gap of the eccentric-coil portion in a negative X-direction, a wire gap of the eccentric-coil portion in a positive Y-direction is greater than a wire gap of the eccentric-coil portion in a negative Y-direction; the wire sections are arranged along a tilted direction from the negative X-direction and the positive Y-direction to the positive X-direction and the negative Y-direction;

in the third coil unit, a wire gap of the eccentric-coil portion in a positive X-direction is less than a wire gap of the eccentric-coil portion in a negative X-direction, a wire gap of the eccentric-coil portion in a positive Y-direction is less than a wire gap of the eccentric-coil portion in a negative Y-direction; the wire sections are arranged along a tilted direction from the negative X-direction and the positive Y-direction to the positive X-direction and the negative Y-direction; and in the fourth coil unit, a wire gap of the eccentric-coil portion in a positive X-direction is less than a wire gap of the eccentric-coil portion in a negative X-direction, a wire gap of the eccentric-coil portion in a positive Y-direction is greater than a wire gap of the eccentric-coil portion in a negative Y-direction; the wire sections are arranged along a tilted direction from the positive X-direction and the positive Y-direction to the negative X-direction and the negative Y-direction.

14. The coil apparatus as claimed in claim 11, wherein the sub-coil of each of the coil units is mounted on a top surface of a substrate, and the eccentric-coil portion is a component bent from inside to outside on the same plane; the wire sections are mounted on a bottom surface of the substrate, and the coil connecting portions of the wire sections are located at edges of the top surface or edges of the bottom surface of the substrate.

\* \* \* \* \*